(12) United States Patent
Otoshi

(10) Patent No.: US 10,670,449 B2
(45) Date of Patent: Jun. 2, 2020

(54) COMBINATION WEIGHING APPARATUS THAT CONTROLS ROTATION SPEED OF DISPERSION TABLE

(71) Applicant: ISHIDA CO., LTD., Kyoto (JP)

(72) Inventor: Hiroki Otoshi, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 211 days.

(21) Appl. No.: 15/943,196

(22) Filed: Apr. 2, 2018

(65) Prior Publication Data
US 2018/0283931 A1   Oct. 4, 2018

(30) Foreign Application Priority Data

Apr. 4, 2017  (JP) .................. 2017-074722

(51) Int. Cl.
*G01G 19/393*   (2006.01)
*G01G 13/16*    (2006.01)

(52) U.S. Cl.
CPC ........... *G01G 19/393* (2013.01); *G01G 13/16* (2013.01)

(58) Field of Classification Search
CPC .............................. G01G 13/16; G01G 19/393
See application file for complete search history.

(56) References Cited

U.S. PATENT DOCUMENTS

| | | | | |
|---|---|---|---|---|
| 4,615,403 A * | 10/1986 | Nakamura | ............ | G01G 11/12 177/121 |
| 4,708,215 A * | 11/1987 | Nakamura | ........... | G01G 13/026 177/109 |
| 7,732,717 B2 * | 6/2010 | Fujii | ................... | G01G 19/393 177/25.18 |

FOREIGN PATENT DOCUMENTS

| | | |
|---|---|---|
| EP | 3196609 A1 | 7/2017 |
| JP | 2011-145245 A | 7/2011 |
| WO | 2016/043324 A1 | 3/2016 |
| WO | 2016/117148 A1 | 7/2016 |

OTHER PUBLICATIONS

Extended European Search Report issued by the European Patent Office dated Jul. 20, 2018, which corresponds to EP18165393.2-1001 and is related to U.S. Appl. No. 15/943,196.

* cited by examiner

*Primary Examiner* — Randy W Gibson
(74) *Attorney, Agent, or Firm* — Studebaker & Brackett PC

(57) ABSTRACT

A weighing apparatus according to the present invention comprises: a dispersion table configured to rotate an article supplied from an outside around a central axis defined in a substantially vertical direction and to convey the article in a direction away from the central axis; an acquisition unit configured to acquire a mass value of the article placed on the dispersion table; and a control unit configured to control a rotation speed of the dispersion table on the basis of the mass value. The control unit is configured to set the rotation speed of the dispersion table to a first rotation speed when the mass value is equal to or less than a first mass value, and to set the rotation speed of the dispersion table to a second rotation speed slower than the first rotation speed when the mass value is a second mass value heavier than the first mass value.

3 Claims, 3 Drawing Sheets

COMBINATION WEIGHING APPARATUS THAT CONTROLS ROTATION SPEED OF DISPERSION TABLE

CROSS-REFERENCE TO RELATED APPLICATIONS

The entire contents of JP Patent Application No. 2017-074722, filed on Apr. 4, 2017 are incorporated in the present specification by reference.

BACKGROUND

Technical Field

The present invention relates to a combination weighing apparatus.

Related Art

In JP 2011-145245 A, a combination weighing apparatus is known, which includes a dispersion table having a steeply inclined surface and a gently inclined surface by forming an eccentric-cone external form and which disperses articles input from above, a plurality of conveying means circularly arrayed around the dispersion table and which conveys the articles supplied from the dispersion table toward the outside, hoppers arranged below outer end portions of the conveying means, and detection means that detects an insufficient hopper to which supply of the articles is insufficient, from the plurality of hoppers.

The combination weighing apparatus described in JP 2011-145245 A is configured to detect that a large number of articles is retained on the dispersion table and increase a rotation speed of the dispersion table to a high speed when a total weight of the articles on the dispersion table exceeds a predetermined value.

SUMMARY

According to the technique described in JP 2011-145245 A, the rotation speed of the dispersion table is increased only when the total weight of the articles exceeds the predetermined value. Therefore, for example, articles adhering to the dispersion table can be suppressed. Such an operation is favorable when operating the dispersion table for emergency avoidance.

However, in the case where a total mass value of the articles is large, there are many articles on the dispersion table. Therefore, if the rotation speed of the dispersion table is increased, the supply amount of the articles to each hopper increases, and thus a phenomenon of exceeding a target input amount to one hopper occurs. If such a phenomenon occurs, the combination accuracy deteriorates.

Therefore, the present invention has been made to solve the above-described problem and an objective is to provide a combination weighing apparatus that can improve the accuracy of an input amount of articles to one hopper by controlling a rotation speed of a dispersion table according to a supply amount of the articles.

A first of the present invention is summarized as a combination weighing apparatus comprising: a dispersion table configured to rotate an article supplied from an outside around a central axis defined in a substantially vertical direction and to convey the article in a direction away from the central axis; an acquisition unit configured to acquire a mass value of the article placed on the dispersion table; and a control unit configured to control a rotation speed of the dispersion table on the basis of the mass value, wherein the control unit is configured to set the rotation speed of the dispersion table to a first rotation speed when the mass value is equal to or less than a first mass value, and to set the rotation speed of the dispersion table to a second rotation speed slower than the first rotation speed when the mass value is a second mass value heavier than the first mass value.

According to the present invention, a combination weighing apparatus that can improve the accuracy of an input amount of articles to one hopper by controlling a rotation speed of a dispersion table according to a supply amount of the articles can be provided.

DETAILED DESCRIPTION

Hereinafter, an embodiment will be described in detail with reference to the drawings as appropriate. Note that detailed description more than necessary may be omitted. For example, detailed description of already known matters and redundant description of substantially the same configuration may be omitted. This is to avoid unnecessary redundancy of the following description and to facilitate understanding by those skilled in the art.

Note that the inventor provides the accompanying drawings and the following description to enable those skilled in the art to sufficiently understand the present disclosure, and does not intend to limit the subject matter recited in the claims by these provided drawings and description.

First Embodiment

Figure 1:
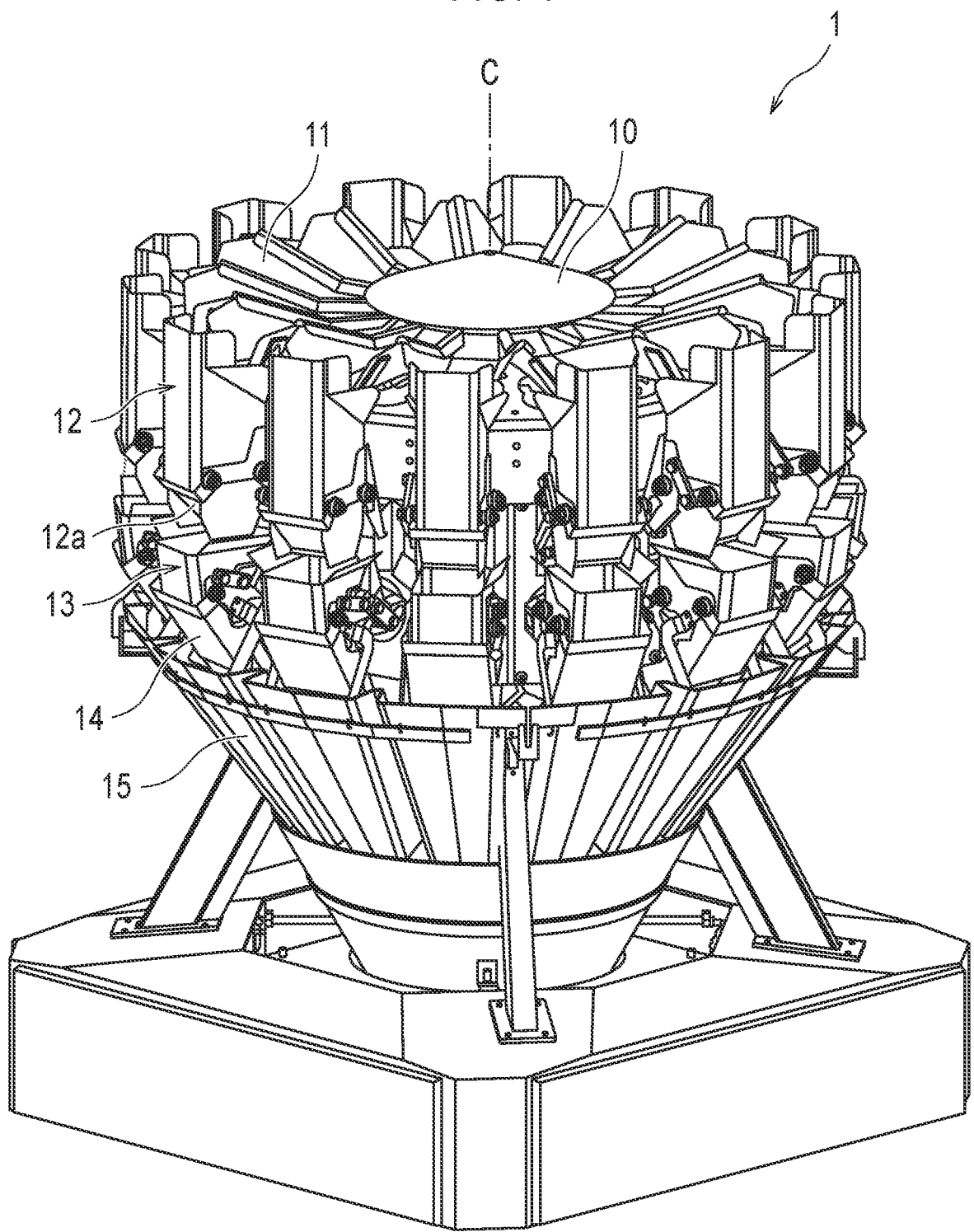
FIG. 1 is a diagram illustrating an example of an external form of a combination weighing apparatus according to a first embodiment.

Hereinafter, a combination weighing apparatus 1 according to the first embodiment will be described with reference to FIGS. 1 to 3. FIG. 1 is a diagram illustrating an example of an external form of a combination weighing apparatus 1 according to the first embodiment, FIG. 2 is a diagram schematically illustrating an example of the combination weighing apparatus 1 according to the first embodiment, and FIG. 3 is a flowchart illustrating an example of an operation of the combination weighing apparatus 1 according to the first embodiment.

Figure 2:
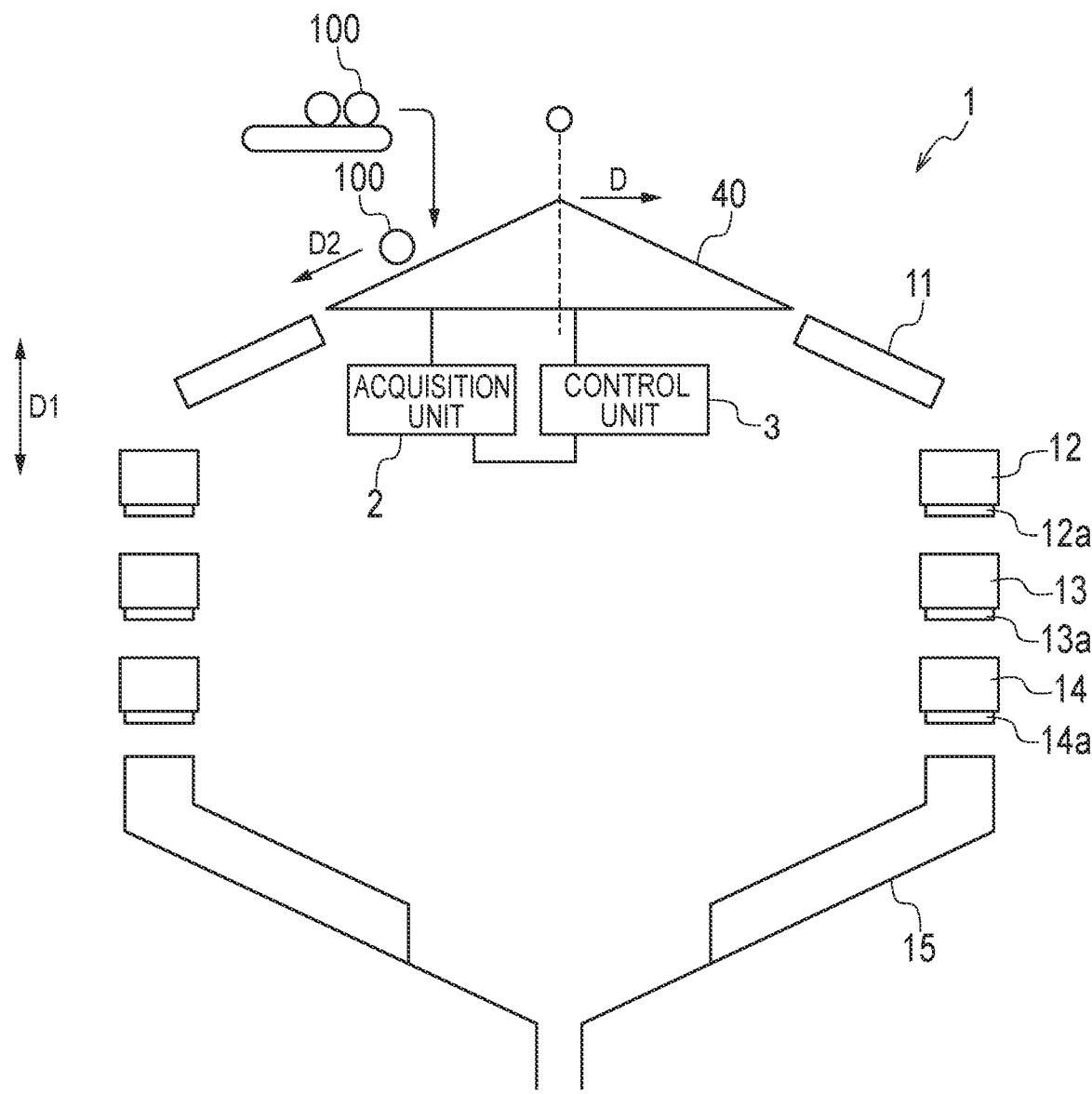
FIG. 2 is a diagram schematically illustrating an example of the combination weighing apparatus according to the first embodiment.
Figure 3:
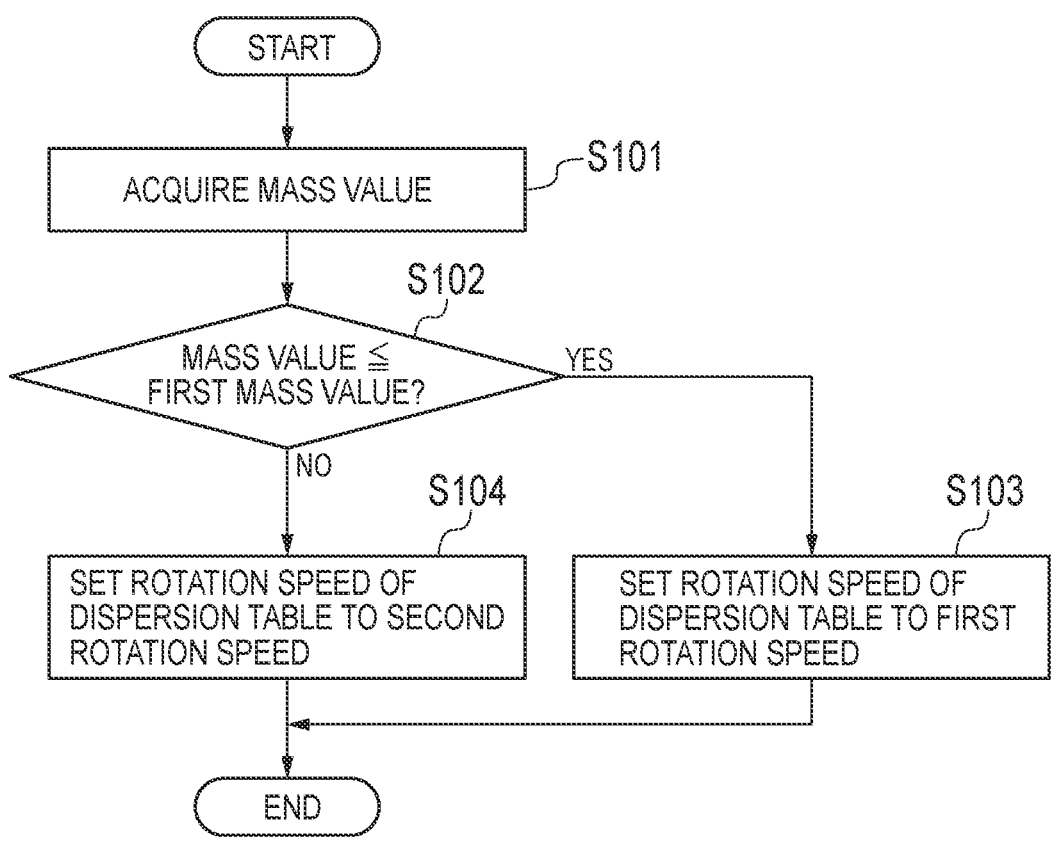
FIG. 3 is a flowchart illustrating an example of an operation of the combination weighing apparatus according to the first embodiment.

As illustrated in FIGS. 1 and 2, the combination weighing apparatus 1 according to the present embodiment comprises a dispersion table 10, a supply trough 11, a plurality of pool hoppers 12, a plurality of weighing hoppers 13, a plurality of booster hoppers 14, a collect and discharge chute 15, an acquisition unit 2, and a control unit 3.

As illustrated in FIG. 2, the dispersion table 10 is configured to rotate an article 100 supplied from the outside around a central axis C defined in a substantially vertical direction D1 and to convey the article 100 in a direction D2 away from the central axis C.

For example, the dispersion table 10 in the present embodiment is driven and rotated around the central axis C extending in the substantially vertical direction D1 to convey the article 100 in the direction D2 away from the central axis C. Here, as the article 100, soft and sticky food such as raw chicken meat is conveyed. However, the article 100 is not limited to the food.

The supply trough 11 is configured to supply the article 100 supplied from the dispersion table 10 to each of the plurality of pool hoppers 12 provided corresponding downstream.

Each of the pool hoppers 12 is configured to temporarily retain the article 100 supplied from the supply trough 11. Gates 12a are respectively provided in lower parts of the pool hoppers 12, and the articles 100 retained in the pool hoppers 12 are discharged to the weighing hoppers 13 provided under the gates 12a by an opening/closing operation of the gates 12a.

Each of the weighing hoppers 13 is configured to temporarily retain the article 100 discharged by each of the pool hoppers 12. Each of the weighing hoppers 13 is connected to a mass detector (not illustrated) including a load cell or the like.

Further, gates 13a are respectively provided in lower parts of the weighing hoppers 13, and the articles 100 retained in the weighing hoppers 13 are discharged to the booster hoppers 14 arranged under the gates 13a by an opening/closing operation of the gates 13a.

Each of the booster hoppers 14 is configured to accommodate the article 100 supplied from each of the weighing hoppers 13 and to temporarily hold the article 100. Gates 14a are respectively provided in lower parts of the booster hoppers 14, and the articles 100 retained in the booster hoppers 14 are discharged to the collect and discharge chute 15 arranged under the gates 14a by an opening/closing operation of the gates 14a.

In the present embodiment, for convenience of description, a case in which a mass detector including a load cell or the like is not connected to the pool hopper 12 will be described as an example. However, the combination weighing apparatus 1 according to the present embodiment is not limited to the case, and a mass detector may be connected to the pool hopper 12 for the purpose of further improvement of the accuracy of weighing the article 100. In such a case, it is the weighing hopper 13 that obtains a final weighed value of the article 100.

The collect and discharge chute 15 is configured to collect the articles 100 discharged from the plurality of booster hoppers 14 and drop the articles 100 downward.

The acquisition unit 2 is configured to acquire a mass value of the article 100 placed on the dispersion table 10. For example, the acquisition unit 2 may be configured by a mass detector including a load cell or the like connected to the dispersion table 10.

The control unit 3 is configured to control a rotation speed of the dispersion table 10 on the basis of the mass value of the article 100 acquired by the acquisition unit 2.

To be specific, the control unit 3 is configured to set the rotation speed of the dispersion table 10 to a first rotation speed when the mass value of the article 100 acquired by the acquisition unit 2 is equal to or less than a first mass value, and to set the rotation speed of the dispersion table 10 to a second rotation speed slower than the first rotation speed when the mass value of the article 100 acquired by the acquisition unit 2 is a second mass value heavier than the first mass value.

According to the configuration, the rotation speed of the dispersion table 10 is configured to become slow when the mass value of the article 100 acquired by the acquisition unit 2 is the second mass value (that is, when the number of the articles 100 placed on the dispersion table 10 is large). Therefore, the input amount of the articles 100 to each of the pool hoppers 12 can be suppressed, and the accuracy of the input amount of the articles to each of the pool hoppers 12 can be improved and the combination accuracy can be improved.

Further, the control unit 3 may be configured to set the rotation speed to a third rotation speed faster than the second rotation speed when the mass value of the article 100 acquired by the acquisition unit 2 is a third mass value heavier than the second mass value.

According to the configuration, when the article 100 having a mass value equal to or larger than a mass value expected at the time of designing is retained on the dispersion table 10 due to adhesion or the like, the speed is increased from the second rotation speed to the third rotation speed. Therefore, the retention state can be eliminated by the acceleration caused at the time of speeding up.

Hereinafter, an example of an operation of the combination weighing apparatus 1 according to the present embodiment will be described with reference to FIG. 3.

As illustrated in FIG. 3, in step S101, the combination weighing apparatus 1 obtains the mass value of the article 100 supplied from the outside and placed on the dispersion table 10.

In step S102, the combination weighing apparatus 1 determines whether the acquired mass value of the article 100 is equal to or less than the first mass value. In the case of Yes, the present operation proceeds to step S103. In the case of No, the present operation proceeds to step S104.

In step S103, the combination weighing apparatus 1 sets the rotation speed of the dispersion table 10 to the first rotation speed, and in step S104, the combination weighing apparatus 1 sets the rotation speed of the dispersion table 10 to the second rotation speed.

According to the combination weighing apparatus 1 of the present embodiment, the rotation speed of the dispersion table 10 is controlled according to a supply amount of the articles 100, whereby the accuracy of the input amount of the articles 100 to the pool hoppers 12 can be improved.

OTHER EMBODIMENTS

As described above, the present invention has been described with the embodiment. It should not be understood that the description and drawings constituting a part of the disclosure in such an embodiment limit the present invention. Various alternative embodiments, examples, and operational techniques will be apparent from the disclosure to those skilled in the art.

What is claimed is:

1. A combination weighing apparatus comprising:
    a dispersion table configured to rotate an article supplied from an outside around a central axis defined in a substantially vertical direction and to convey the article in a direction away from the central axis;
    an acquisition unit configured to acquire a mass value of the article placed on the dispersion table; and
    a control unit configured to control a rotation speed of the dispersion table on the basis of the mass value, wherein
    the control unit is configured to set the rotation speed of the dispersion table to a first rotation speed when the mass value is equal to or less than a first mass value, and to set the rotation speed of the dispersion table to a second rotation speed slower than the first rotation speed when the mass value is a second mass value heavier than the first mass value.

2. The combination weighing apparatus according to claim 1, wherein
the control unit is configured to set the rotation speed of the dispersion table to a third rotation speed faster than the second rotation speed when the mass value is a third mass value heavier than the second mass value.

3. The combination weighing apparatus according to claim 1, wherein
the second rotation speed is slower than the first rotation speed in the same rotation direction as the first rotation speed.

* * * * *